(12) United States Patent
Lee et al.

(10) Patent No.: US 11,449,631 B2
(45) Date of Patent: Sep. 20, 2022

(54) ELECTRONIC DEVICE FOR MANAGING PERSONAL INFORMATION AND OPERATING METHOD THEREOF

(71) Applicant: Samsung Electronics Co., Ltd., Gyeonggi-do (KR)

(72) Inventors: Gawon Lee, Gyeonggi-do (KR); Daehaeng Cho, Gyeonggi-do (KR); Eunyoung Kwon, Gyeonggi-do (KR); Taeckki Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 16/824,888

(22) Filed: Mar. 20, 2020

(65) Prior Publication Data

US 2020/0302088 A1 Sep. 24, 2020

(30) Foreign Application Priority Data

Mar. 21, 2019 (KR) ........................ 10-2019-0032365

(51) Int. Cl.
*G06F 21/62* (2013.01)
*G06F 21/33* (2013.01)
*H04L 9/40* (2022.01)
*H04L 9/06* (2006.01)
*H04L 9/08* (2006.01)
*G06F 16/9535* (2019.01)
(Continued)

(52) U.S. Cl.
CPC ...... *G06F 21/6245* (2013.01); *G06F 16/9535* (2019.01); *G06F 21/335* (2013.01); *H04L 9/0643* (2013.01); *H04L 9/0825* (2013.01); *H04L 9/3247* (2013.01); *H04L 63/0807* (2013.01); *H04L 9/50* (2022.05)

(58) Field of Classification Search
CPC . G06F 21/6245; G06F 21/335; H04L 9/0643; H04L 9/0825; H04L 9/3247; H04L 63/0807
USPC ........................................................ 713/193
See application file for complete search history.

(56) References Cited

U.S. PATENT DOCUMENTS 8,561,211 B1 * 10/2013 Woodward .............. H04L 9/085
380/231
9,203,818 B1 * 12/2015 Roth .................... H04L 63/0846
(Continued)

FOREIGN PATENT DOCUMENTS

| JP | 2002-366551 A | 12/2002 |
| JP | 2007-058781 A | 3/2007 |

(Continued)

OTHER PUBLICATIONS

International Search Report dated Jul. 2, 2020.

*Primary Examiner* — Dant B Shaifer Harriman
(74) *Attorney, Agent, or Firm* — Cha & Reiter, LLC

(57) ABSTRACT

An electronic device, system, and method are disclosed. The electronic device operates within a system of multiple devices. The electronic device, in response to the request of the information owner requesting the provision of personal information to the information requester, requests the authentication server to verify the validity of the information owner's request and the validity of the information requester's identity. If the verification is successful, the electronic device obtains the personal information corresponding to the request and provides it directly to the information requester.

13 Claims, 12 Drawing Sheets

(51) Int. Cl.
    *H04L 9/32*         (2006.01)
    *H04L 9/00*         (2022.01)

(56) References Cited

U.S. PATENT DOCUMENTS

| | | | |
|---|---|---|---|
| 9,374,369 B2* | 6/2016 | Mahaffey | H04L 63/0853 |
| 2003/0152231 A1* | 8/2003 | Tomita | G07C 9/27 |
| | | | 380/258 |
| 2005/0010780 A1* | 1/2005 | Kane | G06F 21/6245 |
| | | | 713/193 |
| 2008/0127314 A1 | 5/2008 | Rowley | |
| 2009/0106823 A1 | 4/2009 | Durski | |
| 2012/0159598 A1* | 6/2012 | Kim | G06F 21/31 |
| | | | 726/7 |
| 2015/0295906 A1* | 10/2015 | Ufford | H04L 63/0815 |
| | | | 726/6 |
| 2017/0295157 A1 | 10/2017 | Chavez et al. | |
| 2018/0083771 A1* | 3/2018 | Bonnell | H04L 9/32 |
| 2018/0091497 A1 | 3/2018 | Nadler et al. | |
| 2018/0248699 A1 | 8/2018 | Andrade | |
| 2019/0068608 A1* | 2/2019 | Boland | G06Q 20/40 |
| 2019/0095598 A1* | 3/2019 | Kobayashi | G06F 21/31 |
| 2020/0051074 A1* | 2/2020 | Suh | G06Q 20/4018 |
| 2020/0202028 A1* | 6/2020 | Tadayon | H04L 63/0414 |

FOREIGN PATENT DOCUMENTS

| | | | | |
|---|---|---|---|---|
| JP | 2015-146128 A | | 8/2015 | |
| JP | 2017-103614 A | | 6/2017 | |
| KR | 10-2014-0029067 A | | 3/2014 | |
| WO | WO-2005088504 A1 * | | 9/2005 | G06F 21/6245 |

* cited by examiner

| User ID | Name | Gender | Age | Address | Certification information | Financial information | Medical information | ... |
|---|---|---|---|---|---|---|---|---|
| User 1 | Hong gil dong | Male | 38 | Seoul ... | Driver's license | Account : A Bank B Bank | Visited hospital: C Hospital | |
| User 2 | Lee young hee | Female | ... | ... | ... | ... | ... | |
| ... | ... | | | | | | | |
| User N | Kim chul soo | Male | | | | | | |

FIG.3A

ELECTRONIC DEVICE FOR MANAGING PERSONAL INFORMATION AND OPERATING METHOD THEREOF

CROSS-REFERENCE TO RELATED APPLICATION(S)

This application is based on and claims priority under 35 U.S.C. 119 to Korean Patent Application No. 10-2019-0032365, filed on Mar. 21, 2019, in the Korean Intellectual Property Office, the disclosure of which is herein incorporated by reference in its entirety.

BACKGROUND

1) Field

Various embodiments of the disclosure relate to an electronic device for managing personal information of a user and an operating method thereof.

2) Description of Related Art

Recently, with advances in communication technology, a diversity of services that use communication technology are provided in all fields of society such as finance, medical care, real estate, and media. In addition, personal information of end users may be utilized to improve the quality of such services.

Personal information typically indicates unique information that can identify an individual. For example, personal information may include identifying information (e.g., social security number, mobile phone number, credit card number, IP information, ID, password, passport number, driver's license number, etc.), physical and/or biometric information (e.g., fingerprint, iris, DNA, height, health status, medical records, disability rating, etc.), asset information (e.g., income information, account information, card information, real estate information, etc.), social information (e.g., education, grades, criminal records, life records, certification records), and the like.

The above information is presented as background information only to assist with an understanding of the disclosure. No determination has been made, and no assertion is made, as to whether any of the above might be applicable as prior art with regard to the disclosure.

SUMMARY

Generally, personal information may be issued and managed by a number of concerned authorities. Accordingly, it is inconvenient for a user to visit the relevant institution in order to request personal information, or access the web service to request the personal information.

In addition, when personal information is leaked, this violates the privacy of the individual, and often results in identity theft and abuse, in various aspects.

Accordingly, various embodiments of the disclosure provide a method and a device for simplifying a procedure for the issuance of personal information of a user in an electronic device.

In addition, various embodiments of the disclosure provide a method and a device for ensuring confidentiality of personal information in an electronic device.

The technical problem to be achieved in this document is not limited to the technical problem mentioned above, and other technical problems not mentioned above may be clearly understood by those skilled in the art from the following description.

An electronic device is disclosed according to various embodiments of the disclosure, including a communication interface, a memory, and at least one processor operatively coupled to the communication interface and the memory. The processor is configured to: receive a personal information request from an information requesting device, receive a validation result for the received personal information request from at least one authentication server and verify the validation result, based on the validity of the received personal information request being verified, retrieve personal information related to the received personal information requested by searching using a search range, and transmitting the retrieved personal information to the information requesting device.

An operational method of an electronic device is disclosed according to various embodiments of the disclosure, including: receiving a personal information request from an information requesting device, receiving a validation result for the received personal information request from at least one authentication server and verifying the validation result, based on the validity for the received personal information request being verified, retrieving personal information related to the received personal information requested by searching using a search range, and transmitting the retrieved personal information to the information requesting device.

A personal information providing system is disclosed, including: an information requesting device configured to transmit a personal information request, the request associated with permission information generated by an information providing device, and an electronic device configured to receive the personal information request, verify a validity verification result for the personal information request, and, based on successful verification, retrieve personal information using a search range, and transmitting the retrieved personal information to the information requesting device, wherein the permission information includes a token and a certificate in which at least one of the following is signed with a signature key: an identifier of the information providing device that generated the permission information, the search range associated with the personal information, and a time stamp associated with the search range.

An electronic device is disclosed, including: a memory, and at least one processor operatively coupled to the memory, wherein the memory stores instructions executable by the processor to cause the electronic device to: store at least one piece of personal information in the memory, wherein the at least one piece of personal information is further stored in a registration server, receive a personal information request, retrieve personal information corresponding to the personal information request from the memory, and output the retrieved personal information.

According to various embodiments, in response to the request of the information owner requesting the provision of personal information to the information requester, the electronic device requests the authentication server to verify the validity of the information owner's request and the validity of the information requester's identity. If the verification is successful, the personal information corresponding to the request is obtained and directly provided to the information requester, thereby simplifying the personal information issuing procedure. In addition, according to various embodiments, when the validity of the request of the information owner and the validity of the information requester's identity are verified, the electronic device obtains personal information by using the encryption key of the information owner and the electronic device, thereby ensuring confidentiality of the personal information.

Effects obtained in the disclosure are not limited to the above-mentioned effects, and other effects not mentioned above may be clearly understood by those skilled in the art from the following description.

BRIEF DESCRIPTION OF THE DRAWINGS

The above and other aspects, features, and advantages of various embodiments of the disclosure will be more apparent from the following description taken in conjunction with the accompanying drawings, in which:

FIG. 3A is a view illustrating a form of personal information stored in a registration server;

In connection with the description of the drawings, the same or similar reference numerals may be used for the same or similar components.

DETAILED DESCRIPTION

Hereinafter, various embodiments of the disclosure will be described in detail in conjunction with the accompanying drawings. In the following description of the disclosure, a detailed description of functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Figure 1:
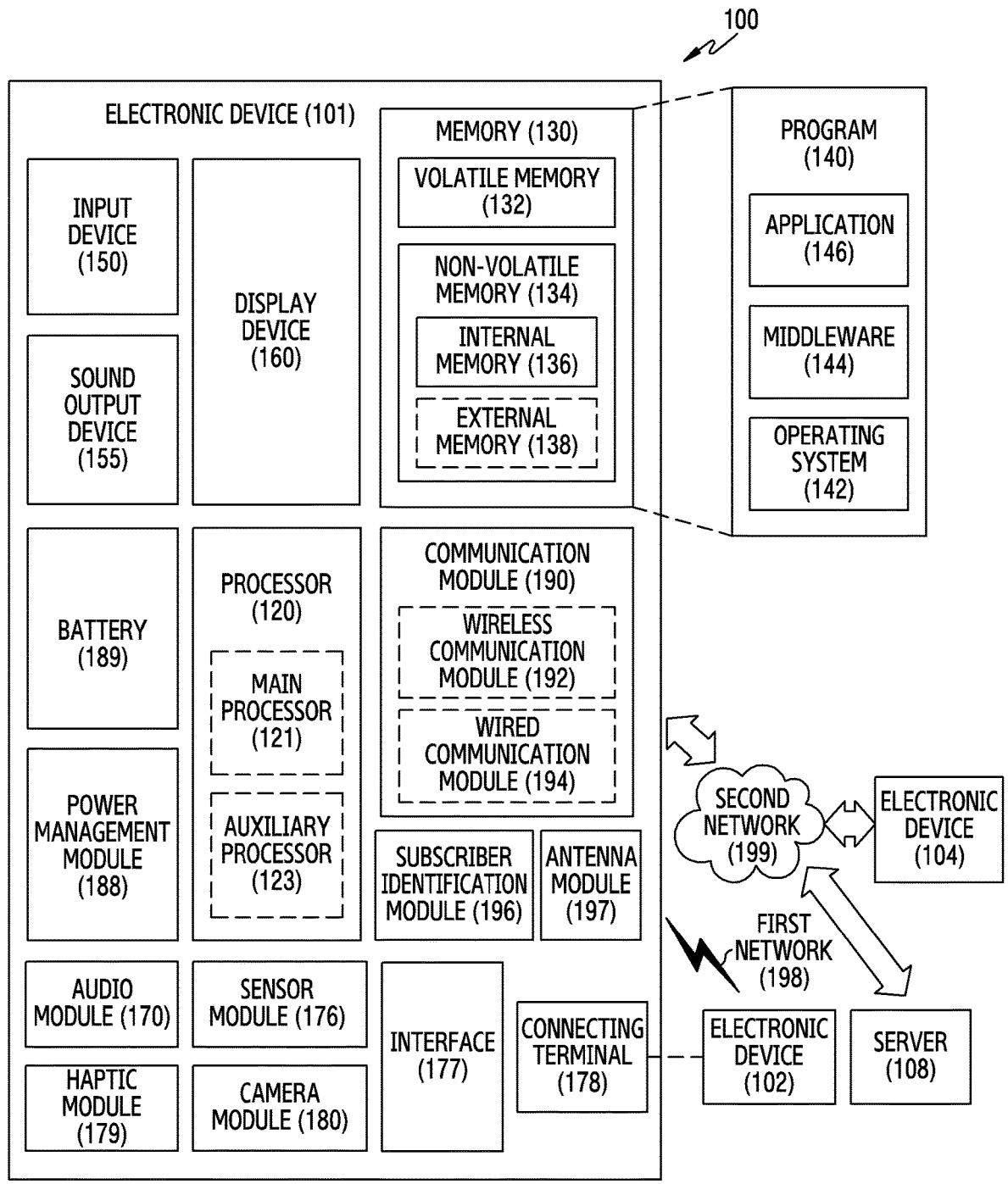
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
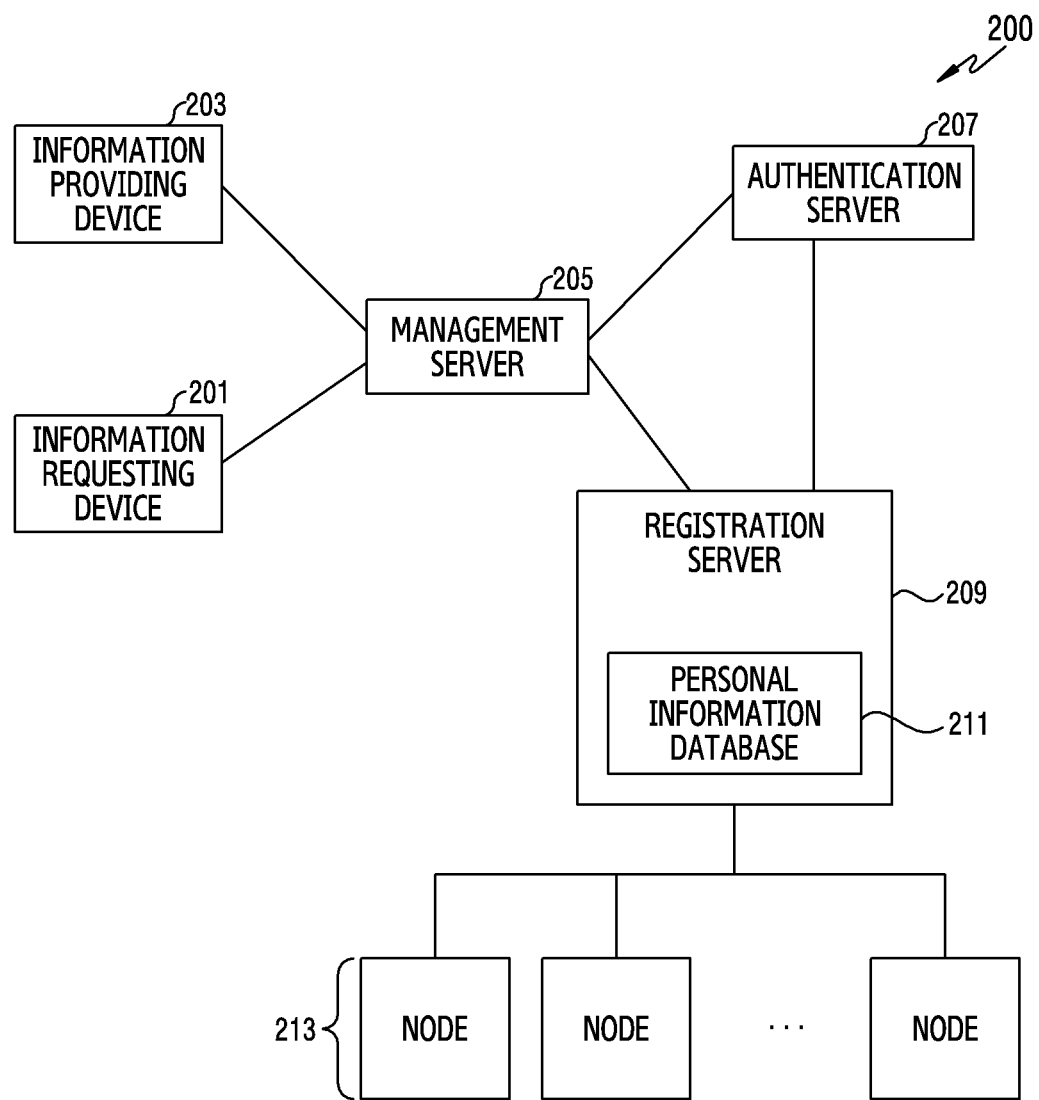
FIG. 2A is a view illustrating an example of a personal information providing system according to various embodiments of the disclosure.

FIG. 2A is a view illustrating an example of a personal information providing system 0200 according to various embodiments of the disclosure.

Referring to FIG. 2A, in various embodiments, the personal information providing system 200 may include an information requesting device 201, an information providing device 203, a management server 205, an authentication server 207, and a registration server 209. According to an embodiment, at least some components of the information requesting device 201, the information providing device 203, the management server 205, the authentication server 207, and the registration server 209 shown in FIG. 2A may correspond to the components of an electronic device 101 of FIG. 1.

According to various embodiments, the information providing device 203, as an owner of the personal information, may request to register personal information in a personal information database 211 of the registration server 209. In addition, the information providing device 203 may process to share personal information through the management server 205 in response to receiving a personal information inquiry request from the information requesting device 201. For example, the information providing device 203 may generate permission information for allowing access to the personal information by the management server 205 and provide the same to the information requesting device 201. The permission information may include a token and a certificate in which at least one of an identifier of its owner (e.g., the information providing device 203) that permits inquiry of personal information, an inquiry range of personal information, and time information (e.g., a time stamp) designating an inquiry range is signed with a signature key.

According to an embodiment, the information providing device 203 may store an encryption key and a signature key. For example, an encryption key includes a key for encrypting personal information (e.g., a public encryption key) and a key for decryption (e.g., a private encryption key), and the signature key may be implemented as a key for generating a signature (e.g., a private signature key) and a key for signature verification (e.g., a public signature key). According to an embodiment, the information providing device 203 may be issued an encryption key and a signature key via at least one authenticated device (e.g., an authorized authority), for example, the management server 205 and the registration server 209. In addition, the information providing device 203 may store an encryption key and a signature key in an internal security area (e.g., an embedded secure element (eSE)). However, this is only illustrative, and the disclosure is not limited thereto. For example, the encryption key and the signature key may be stored in a separate storage space such as a universal IC card, IC card, a secure digital (SD) card, and the like, having a certain level of security. According to various embodiments, the information providing device 203 may further store a certificate for an encryption key and/or a signature key. For example, the certificate may be issued by an authorized authority.

According to various embodiments, the information requesting device 201, as a subject for requesting personal information to the information providing device 203, may request a personal information inquiry and receive (213) permission information for allowing access to personal information by the management server 205 from the information providing device 203 as a response thereto. According to an embodiment, the information requesting device 201 may receive personal information related to the information providing device 203 from the management server 205, based on the received permission information.

According to various embodiments, the management server 205 may manage at least one account for the information providing device 203. The account of the information providing device 203 may be an address where at least one piece of personal information related to the information providing device 203 is stored.

According to an embodiment, the management server 205 may request the authentication server 207 to validate the received personal information request, in response to receiving the personal information request from the information request device 201. For example, the validation may include a first verification for verifying a token signed by the information providing device 203 included in the received personal information request and/or a certificate for authenticating the same and a second verification for verifying the information requesting device 201 requesting personal information. According to an embodiment, the management server 205 may generate a transaction including a token and a certificate, based on the account of the information providing device 203 to perform validation. For example, the management server 205 may store at least one of the information of the information requesting device 201 and request information in association with an account of the information providing device 203 so that the inquiry history of the personal information of the information providing device 203 can be recorded.

According to an embodiment, if the personal information request is validated, the management server 205 may obtain (219) personal information corresponding to the request of the information requesting device from the registration server 209. The management server 205 may access the personal information corresponding to the request of the information requesting device 201, based on the identifier of the information providing device 203 included in the personal information request. According to an embodiment, personal information stored in the registration server 209 may be encrypted. In addition, the management server 205 may decrypt the obtained encrypted personal information and provide it to the information requesting device. For example, the encrypted personal information may be decrypted based on at least some of the encryption keys of the information providing device 203 (or apparatus) and the management server 205. The management server 205 may generate different unique encryption keys or generate and store the same encryption key for each information providing device 203. According to another embodiment, if the personal information request is not validated, that is, when at least one of the first verification and the second verification fails, the management server 205 notifies of the verification failure and may also stop sharing of the personal information.

According to various embodiments, the authentication server 207, as a subject for verifying the validity of the personal information request, may verify the validity of the personal information request in response to the request of the management server 205. According to an embodiment, as described above, the validation may include a first verification that verifies a token signed by the information providing device 203 (or apparatus) included in the received personal information request and/or a certificate authenticating the same. For example, the authentication server 207 may determine whether the user's signature is a normal signature by verifying the token and may verify forgery of the certificate, i.e., the integrity of the certificate by verifying the certificate. The authentication server 207 may perform the first verification using various techniques. For example, the authentication server 207 may perform the first verification, based on at least a part of the public signature key for signature verification of the information providing device 203. For example, the public signature key may be included in the certificate included in the transaction generated by the information providing device 203, and the authentication server 207 may perform the first certification for verifying the received token using the public signature key. As another example, the authentication server 207 may additionally consider time information (e.g., timestamp) when performing the first verification. For example, the time information may be related to the verification request time (e.g., when the transaction was generated) and the like, and the authentication server 207 may determine that the certificate is valid when the verification request time is within a specified time (e.g., 10 minutes). In addition, the validity verification may include a second verification that verifies the information requesting device 201 which has requested the personal information, as described above. For example, the authentication server 207 may perform the second verification using various techniques. For example, the authentication server 207 may perform the second verification by comparing the access information used by the information requesting device 201 to access the management server 205 with information related to the information requesting device 201 stored in the personal information database 211.

According to various embodiments, the registration server 209 stores personal information of the information providing device 203 (or apparatus), and may encrypt and store the personal information of the information providing device 203 (or apparatus) in the personal information database 211. The registration server 209 may be connected to each node 213 managing personal information. Each node 213 may represent institutions and/or agencies that handle personal information, and may include for example a police or motor vehicle agency issuing a driver's license, a hospital issuing medical records, a resident center issuing a resident registration cards, and the like. For example, the registration server 209 may grant reliability of the personal information by partitioning a personal information database for each corresponding node and granting access authority for each personal information database partition to the corresponding node. However, this is only illustrative, and the disclosure is not limited thereto. For example, the personal information database 211 of the registration server 209 may be integrated to allow access to all nodes. According to an embodiment, when the personal information is issued through at least one node, the registration server 209 may encrypt the issued personal information to register the same in the personal information database 211 (e.g., a personal information database or an integrated personal information database corresponding to the node). In this case, the personal information may be encrypted based on at least a portion of the encryption key of the information providing device 203 and the encryption key of the authenticated device. For example, the authenticated device may include at least one of the management server 205 and the registration server 209.

In the above-described embodiment, the personal information providing system 200 in which the management server 205, the authentication server 207, and the registration server 209 exist in separate configurations has been described. However, this is only illustrative, and the disclosure is not limited thereto. For example, at least two of the management server 205, the authentication server 207, and the registration server 209 may be integrated into one unit.

Figure 2B:
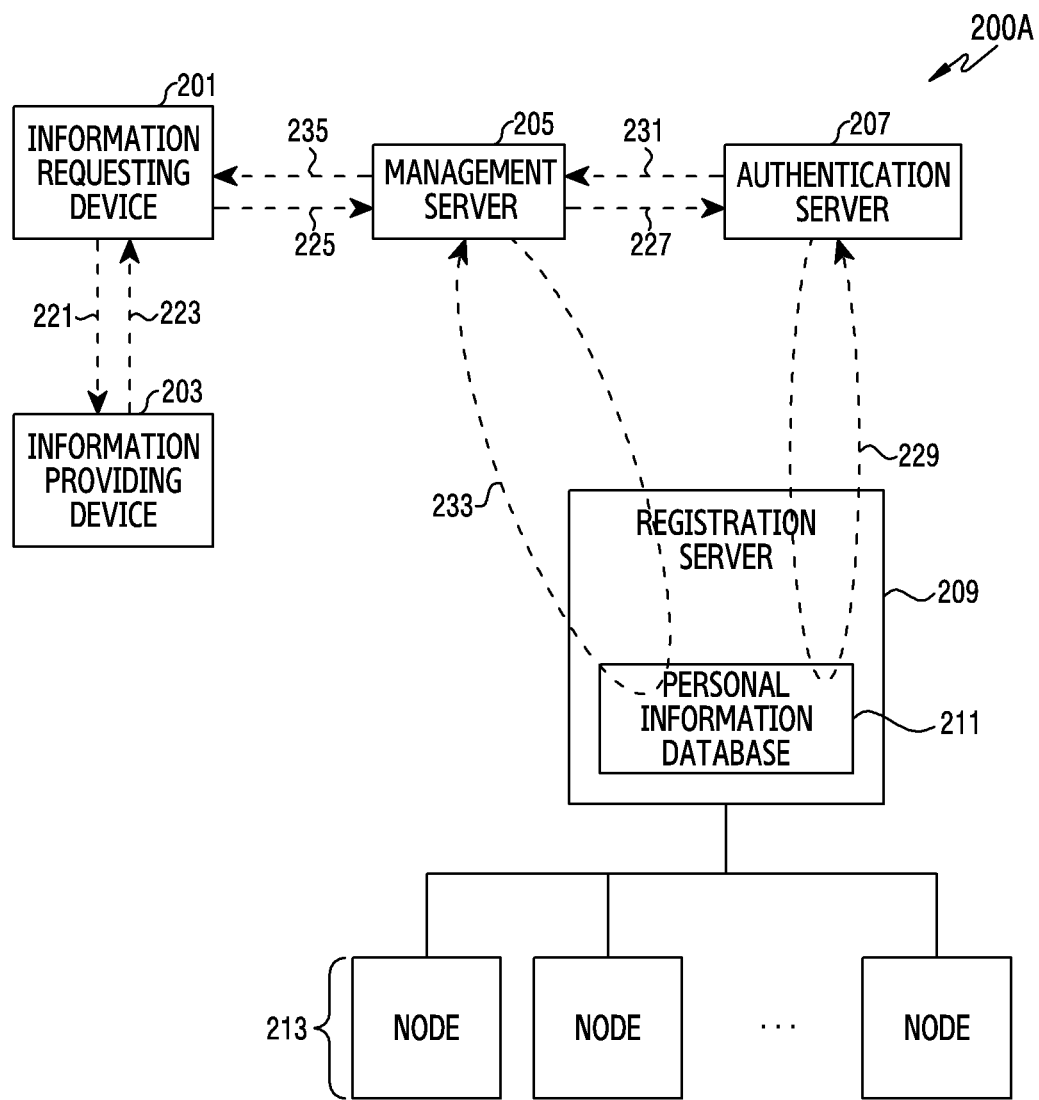
FIG. 2B is a view illustrating an operation of a personal information providing system according to various embodiments of the disclosure.

FIG. 2B is a view illustrating an operation 200A of a personal information providing system 200 according to various embodiments of the disclosure.

In various embodiments, the personal information providing system 200 may include an information requesting device 201, an information providing device 203, a management server 205, an authentication server 207 and a registration server 209. According to an embodiment, some components of the information requesting device 201, the information providing device 203, the management server 205, the authentication server 207 and the registration server 209 illustrated in FIG. 2A may correspond to the components of the electronic device 101 of FIG. 1. In addition, in connection with the description of FIG. 2B, the description of the same or similar elements as those of FIG. 2A will be omitted.

Referring to FIG. 2B, the information requesting device 201 may request a personal information from the information providing device 203. For example, as described below with reference to FIG. 7, the information requesting device 201 may generate an inquiry for a personal information item stored in the information providing device 203, and transmit the generated inquiry about the designated personal information item. As another example, the information requesting device 201 may transmit the inquiry or request for personal information using at least one of wireless communication (e.g., Wi-Fi, Bluetooth, near field control (NFC), ultra-wideband (UWB), etc.), a code image (e.g., QR code, color code, etc.), and the like.

In operation 223, the information providing device 203 may process the request to determine whether to share personal information, through the management server 205, after receiving the personal information inquiry request 221 from the information requesting device 201. According to an embodiment, the information providing device 203 may generate permission information for permitting the management server 205 to access the personal information, and provide the permission information to the information requesting device 201. As described above, the permission information may include a token and a certificate, and the token may include an inquiry range that indicates (e.g., limits) a range of personal information that can be provided to the information requesting device 201. For example, as described below with reference to FIG. 7, the information providing device 203 (or apparatus) may designate an issuer of personal information for which inquiries are permitted based on an input, an item for which inquiry is permitted, and other such details in the inquiry range. According to an embodiment, the information providing device 203 may provide the permission information to the information requesting device 201 using wireless communication (e.g., mobile communication, Wi-Fi, Bluetooth, NFC, etc.). According to another embodiment, the information providing device 203 may generate a code image including the permission information (e.g., QR code, color code, etc.) and provide the permission information to the information requesting device 201 using the code image. In addition, the information providing device 203 may perform a predetermined authentication operation (e.g., password authentication, bio information authentication, etc.) for authenticating the user of the information providing device 203 before providing the permission information to the information requesting device 201, and may transmit the permission information when the authentication is successful.

In operation 225, the information requesting device 201 may continue the process of requesting personal information related to the information providing device by communication with the management server 205, based on the permission information received from the information providing device 203. For example, the information requesting device 201 may request personal information by transmitting the permission information to the management server 205. In addition, the information requesting device 201 may access the management server 205 using its own access information (e.g., login ID, password, etc.) to continue the request for personal information.

In operation 227, the management server 205 may request validation of the received personal information request in response to receiving the personal information request from the information requesting device 201. As described above, the validation may include a first verification verifying a token signed by the information providing device 203 included in the received personal information request, and/or verifying a certificate for authenticating the same, and a second verification verifying the information requesting device 201 requesting personal information. For example, the management server 205 may request validation by transmitting permission information, including a token and a certificate, and access information of the information request device 201 to the authentication server 207.

In operation 229, the authentication server 207 may authenticate the personal information request in response to the request of the management server 205. According to an embodiment, as described above, validation verification may include a first verification of a token signed by the information providing device 203 included in the received personal information request, and/or verifying a certificate for authenticating the same. For example, the authentication server 207 may determine whether the user's signature is normal by verifying the token, and determine whether the certificate is a forgery by verifying the certificate to confirm its integrity. The authentication server 207 may perform the first verification using a variety of techniques. For example, the authentication server 207 may perform the first verification, based on at least a part of the public key of the information providing device 203 and/or the public signature key for signature verification of the management server 205. For example, the public signature key may be included in the certificate included in the transaction generated by the information providing device 203, and the authentication server 207 may perform the first certification for verifying the received token using the public signature key. In addition, validation verification may include the second verification that verifies the information requesting device 201 requesting the personal information, as described above. For example, the authentication server 207 may perform the second verification using various techniques. For example, the authentication server 207 may perform the second verification by comparing the access information used by the information requesting device 201 to access the management server 205 with information related to the information requesting device 201 stored in the personal information database 211.

In operation 231, the authentication server 207 may provide the validation verification result for the personal information request to the management server 205. For example, the authentication server 207 may indicate verification success when both the first verification and the second verification are successful. In addition, when at least one of the first verification and the second verification fails, the authentication server 207 indicate verification failure.

In operation 233, when the validity of the personal information request is successfully verified, the management server 205 may receive personal information corresponding to the request of the information request device 201 from the registration server 209. The management server 205 may receive personal information corresponding to the request of the information request device 201, based on the identifier of the information providing device 203 included in the personal information request. In addition, the management server 205 may classify the personal information corresponding to the authorized inquiry range among the obtained personal information. According to an embodiment, the personal information stored in the registration server 209 may be stored in an encrypted state. The management server 205 may decrypt the obtained encrypted personal information, and provide the decrypted version to the information request device 201. For example, the encrypted personal information may be decrypted based on encryption keys of the information providing device 203 (or apparatus) and the management server 205. According to another embodiment, if the validation of the personal information request is not validated, that is, when at least one of the first verification and the second verification fails, the management server 205 may notify of the verification failure and stop sharing of personal information.

In operation 235, the management server 205 may provide the obtained personal information to the information requesting device 201.

In the above-described embodiment, the information providing device 203 that has received a request for personal information inquiry from the information request device 201 allows access to personal information, and a separate operation for providing personal information is performed by the management server 205. As a result, in the aspect of the information providing device 203, it is possible to obtain the effect of simply providing the personal information to the information requesting device, and as the personal information is managed by an authorized institution (e.g., the management server 205, the authentication server 207, the registration server 209, etc.), it is possible to obtain the effect of protecting personal information securely.

Figure 2C:
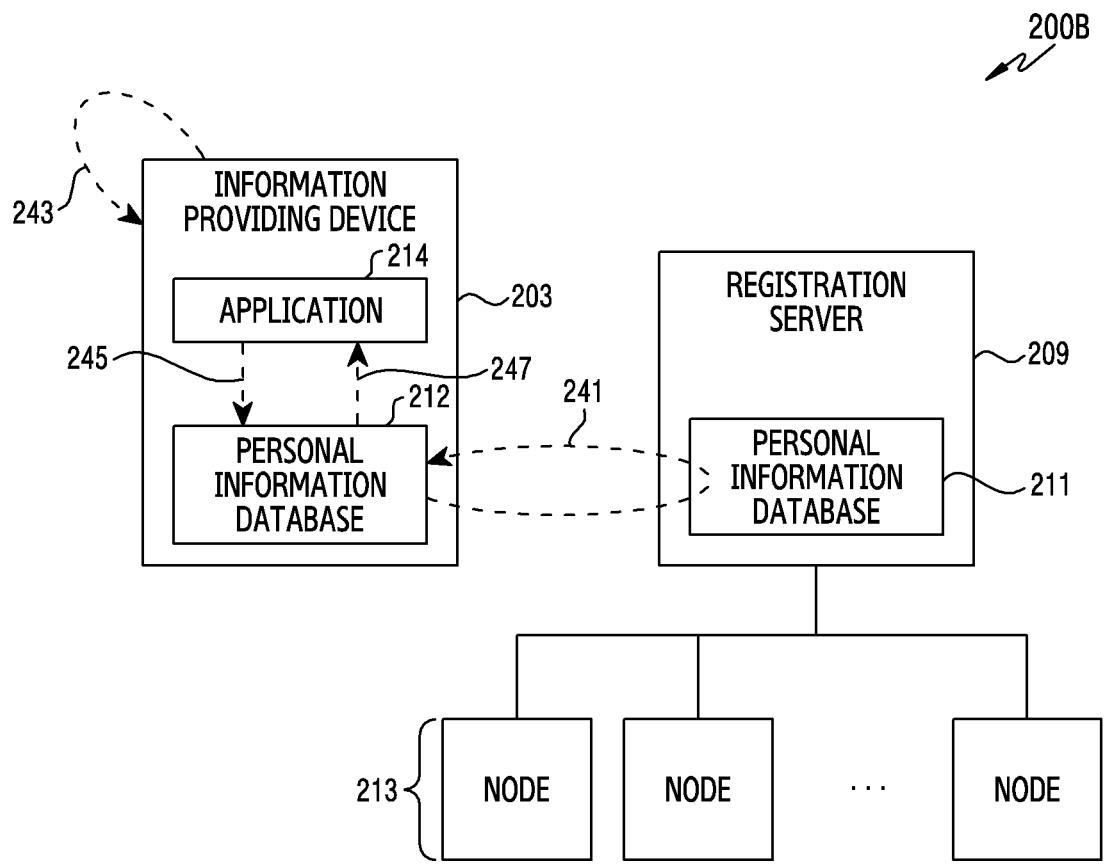
FIG. 2C is a view illustrating another operation of a personal information providing system according to various embodiments of the disclosure.

FIG. 2C is a view illustrating another operation 200B of a personal information providing system 200 according to various embodiments of the disclosure.

In various embodiments, the personal information providing system 200 may include an information requesting device 201, an information providing device 203, an authentication server 207 and a registration server 209. According to an embodiment, some components of the information requesting device 201, the information providing device 203, the authentication server 207 and the registration server 209 illustrated in FIG. 2B may correspond to the components of the electronic device of FIG. 1. In addition, the personal information providing system 200 according to FIG. 2C is different from the information providing device 203 (or apparatus) illustrated in FIG. 2B in that a management server does not exist. For example, the information providing apparatus 203 illustrated in FIG. 2C may further perform the role of the management server 205 illustrated in FIG. 2B. In addition, with respect to the description of FIG. 2C, descriptions of components that are the same as or similar to those of FIGS. 2A and 2B will be omitted.

Referring to FIG. 2C, in operation 241, the information providing device 203 may download and store the personal information database 211 from the registration server 209. The personal information database 211 may be downloaded periodically or by a designated event, such as when a user request is issued.

In operation 243, the information providing device 203 may detect a personal information inquiry event. The personal information inquiry event may be generated when a user inquires about at least one piece of personal information stored in the information providing device 203. For example, the information providing device 203 may detect a request to execute an application 214 which includes an inquiry function for providing personal information.

In operation 245, the information providing device 203 may access the personal information database 212 in response to detecting the personal information inquiry event. According to an embodiment, the information providing device (e.g., application 214) may identify whether the user who generated the personal information inquiry event has been granted access to the personal information database 212 and/or identify the range of personal information that the use is permitted to access, based on identification information (e.g., device information, user ID, etc.) for the user who requested execution of the application 214.

In operation 247, the information providing device 203 may obtain the personal information corresponding to the personal information inquiry event from the stored personal information database 212 and provide the obtained personal information to the user who generated the personal information inquiry event. As described above, the personal information may be encrypted based on at least a portion of the encryption key of the information providing device 203 and the encryption key of the authenticated device. Therefore, the information providing device may decrypt and provide the obtained personal information using at least a portion of an encryption key (e.g., a personal encryption key) owned by the information providing device.

The embodiment related to FIG. 2C described above relates to an embodiment for a user of the information providing device 203 to directly inquiry about his or her personal information, and there is a difference from the embodiments described in FIGS. 2A and 2B in that the operation of requesting validation of a personal information request to the authentication server 207 is omitted. In other words, the above-described embodiment related to FIG. 2C may provide an effect of simply retrieving personal information having reliability by omitting a validation request operation (e.g., a transaction generation operation).

Figure 3B:
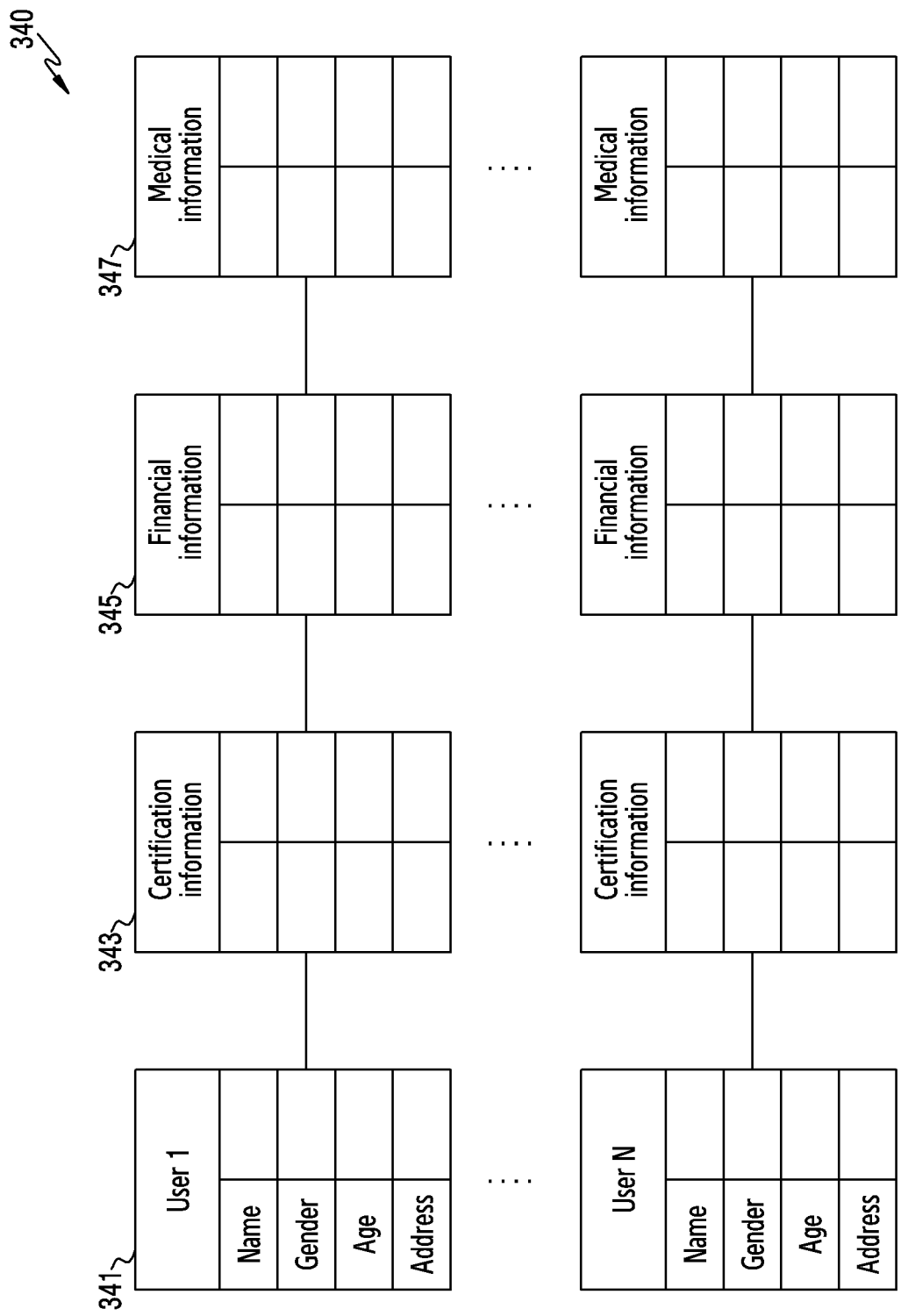
FIG. 3B is a view illustrating a form of personal information stored in a registration server.

FIGS. 3A and 3B are views illustrating forms of personal information stored in a registration server.

Referring to FIG. 3A, the personal information 300 may include user information 310 and derivative information 320, and the personal information 300 may be managed by a user ID (e.g., an information providing device identifier) 301. The user information 310 may include information for identifying an individual such as a name 303, a gender 305, an age 307, an address 309, and the like. In addition, the derivative information 320 may include certification information 311, financial information 313, medical information 315, and the like. FIG. 3A illustrates an embodiment in which the above-described personal information is stored in a table form. However, this is only illustrative, and the disclosure is not limited thereto. For example, the registration server 209 may store personal information generated over time in blocks, and may store the blocks in the form of a block chain in which the blocks are chained together. For example, as shown in FIG. 3B, in the personal information 340, user information may be stored in the first block 341 and each derivative information is stored in subsequent blocks 343, 345, and 347.

According to various embodiments, an electronic device (e.g., the management server 205 of FIG. 2A) may include a communication interface, a memory, and at least one processor that is operably connected to the communication interface and the memory. The memory, when executed, may store instructions to cause the processor to detect a personal information request event, identify a validation result for the detected personal information request from at least one authentication server, if the validation of the personal information request is verified, obtain the personal information, based on the inquiry range, and provide the obtained personal information to the information requesting device.

According to an embodiment, the instructions allow reception of permission information generated by the information providing device from the information requesting device, and the permission information may include a token and a certificate in which at least one of an identifier of the information providing device that generated the permission information, an inquiry range of personal information, and time information designating an inquiry range is signed with a signature key.

According to an embodiment, the validation result may include a first verification result for validating the token and a second verification result for verifying the information requesting device that has transmitted the permission information, wherein the instructions may be configured to receive the first verification result and the second verification result through at least one authentication server.

According to an embodiment, the instructions may cause to request the validation request for the at least one authentication server and to record the validation verification request.

According to an embodiment, the instructions may cause to primarily classify personal information associated with the information providing device from at least one piece of personal information stored in the registration server, based on the identifier of the information providing device, included in the permission information, and may cause the primarily classified personal information to be secondarily classified, based on the inquiry range included in the permission information.

According to an embodiment, at least one piece of personal information stored in the registration server may be coupled in a block chain.

According to an embodiment, the instructions may be configured to decrypt the obtained personal information, based on at least a portion of an encryption key of the information providing device and an encryption key of the electronic device.

According to various embodiments, an electronic device (e.g., the information providing device 203 of FIG. 2C) may include a memory, and at least one processor that is operably connected to the memory. The memory, when executed, may store instructions to cause the processor to store at least one piece of personal information stored in the registration server in the memory, detect a personal information request event, obtain personal information corresponding to the personal information request event from the memory, and output the obtained personal information.

According to an embodiment, the instructions may determine the access range for the at least one piece of personal information stored in the memory, based on the user's identification information related to the personal information request event.

According to various embodiments, a personal information providing system may include an information requesting device configured to transmit a personal information request, based on at least a portion of the permission information generated by an information providing device and an electronic device may be configured to identify the validation verification result for the detected personal information request in response to receiving the personal information inquiry request, and obtain personal information, based on the inquiry range to provide the personal information to the information requesting device when the validity of the personal information request is verified. According to an embodiment, the permission information may include a token and a certificate in which at least one of an identifier of the information providing device that generated the permission information, an inquiry range of personal information, and time information designating an inquiry range is signed with a signature key.

According to an embodiment, the personal information providing system may further include an authentication server, wherein the authentication server may be configured to perform a first verification operation for verifying the validity of the token and a second verification operation for verifying the information requesting device that has transmitted the permission information, and provide the result of the verification operation to the electronic device.

According to an embodiment, the personal information providing system may further include a registration server, wherein the registration server may be configured to store at least one piece of information for the at least one information providing device.

According to an embodiment, the electronic device may be configured to primarily classify the personal information related to the information providing device of the at least one piece of personal information stored in the registration server, based on the identifier of the information providing device, included in the permission information, and secondarily classify the primary classified personal information, based on the inquiry range included in the permission information.

According to an embodiment, the electronic device may be configured to request the validity verification from the authentication server and record the validity verification request.

Figure 4:
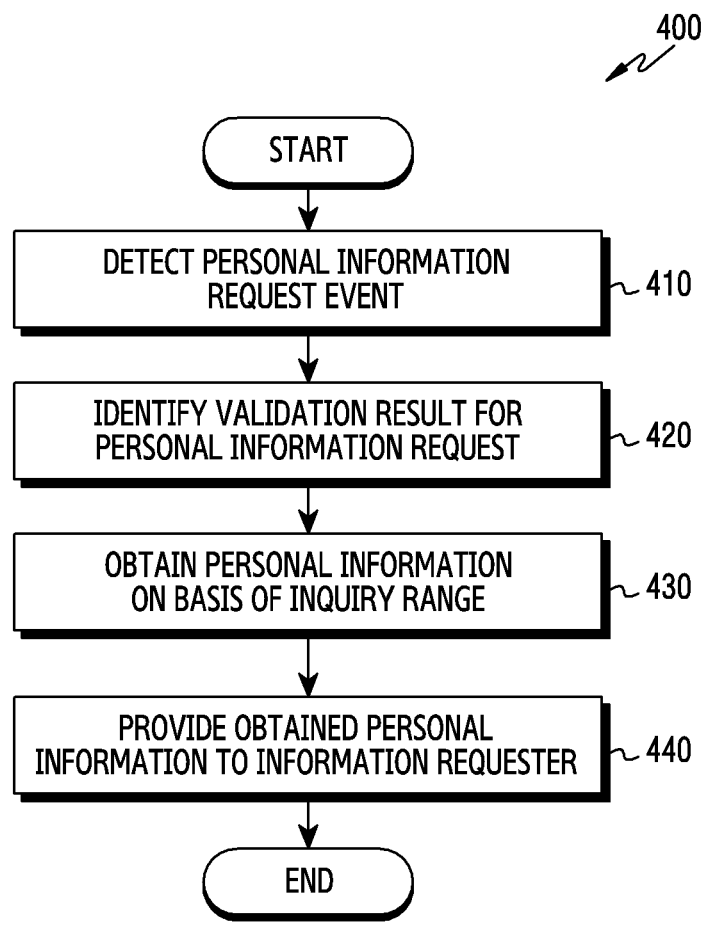
FIG. 4 is a flowchart illustrating a personal information management operation of a management server according to various embodiments of the disclosure.

FIG. 4 is a flowchart 400 illustrating a personal information management operation of a management server according to various embodiments of the disclosure. In the following embodiments, the operations may be performed sequentially, but are not necessarily performed sequentially. For example, the order of each operation may be changed and at least two operations may be performed in parallel. The management server of FIG. 4 may be the management server 205 of FIGS. 2A and 2B.

Referring to FIG. 4, a management server (e.g., the processor 120 of FIG. 1) according to various embodiments may detect a personal information request event, in operation 410. The personal information request event may include identifying an authenticated information request device. For example, the processor 120 may provide a service for managing individual personal information, and detect an access (e.g., login) of an authenticated information request device (e.g., the information requesting device 201 of FIG. 2A) as a personal information request event. According to an embodiment, the processor 120 may receive permission information including a token, and a certificate signed with a signature key of at least an identifier of an information providing device (e.g., the information providing device 203 of FIG. 2A) which allows for searching of personal information, input of a search range for personal information, and time information (e.g., a timestamp) for the search range, in response to detecting the personal information request event. Accordingly, the processor 120 may identify the information requesting device, and receive search terms defining the personal information which is being requested.

The management server (e.g., the processor 120 of FIG. 1) according to various embodiments may determine a validity verification result for the personal information request in operation 420. The validity verification result may include a first verification result for a token and/or a certificate generated by the information providing device, and a second verification result for verifying the information requesting device itself, as described above. For example, validity verification may be performed by an authentication server (e.g., the authentication server 207 of FIG. 2A), and the processor 120 may request the validity verification from the authentication server, and receive a verification result from the authentication server in response. However, this is merely an example, and various embodiments may be applied, and the embodiments of the disclosure are not limited thereto. For example, validity verification may be performed by the management server directly.

The management server (e.g., the processor 120 of FIG. 1) according to various embodiments may obtain personal information, based on the search range (or inquiry range) in operation 430. According to an embodiment, the processor 120 may retrieve personal information to be provided to the information requesting device, based on the search range included in the token signed by the information providing device. For example, the management server may obtain personal information corresponding to the request of the information requesting device from personal information stored in the management server or outside the management server (e.g., the registration server of FIG. 2A).

The management server (e.g., the processor 120 of FIG. 1) according to various embodiments may provide the obtained personal information to the information requesting device, in operation 440. The obtained personal information may be encrypted with a predetermined encryption key, and the processor 120 may decrypt the encrypted personal information using the predetermined encryption key and provide the same to the information requesting device. For example, the encryption key may be a common encryption key shared between the management server and the information providing device. For example, a common cryptographic key can be generated via a Diffie-Hellman key agreement. However, this is merely an example, and various embodiments may be applied, and the embodiments of the disclosure are not limited thereto. For example, personal information can be encrypted by various kinds of encryption keys.

Figure 5:
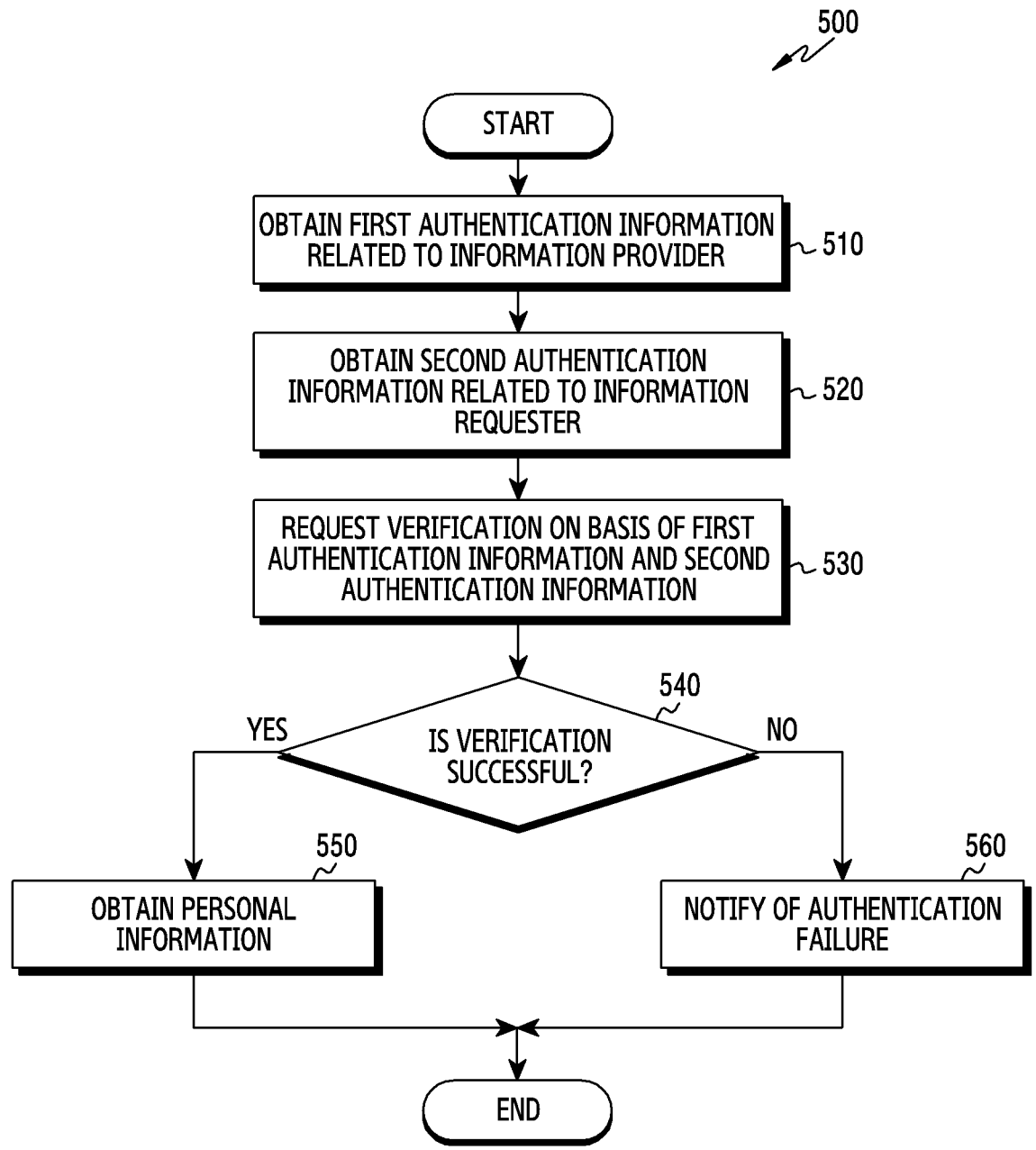
FIG. 5 is a flowchart illustrating an operation of identifying a validity of a personal information request in a management server according to various embodiments of the disclosure.

FIG. 5 is a flowchart 500 illustrating an operation of identifying a validity of a personal information request in a management server according to various embodiments of the disclosure. The operations of FIG. 5 described below may illustrate various embodiments of operations 420 and 430 of FIG. 4. In the following embodiments, the operations may be performed sequentially, but are not necessarily performed sequentially. For example, the order of each operation may be changed and at least two operations may be performed in parallel. The management server of FIG. 5 may be the management server 205 of FIGS. 2A and 2B.

Referring to FIG. 5, a management server (e.g., the processor 120 of FIG. 1) according to various embodiments may obtain a first authentication information related to an information providing device (the information providing device 203 of FIG. 2A), in operation 510. As described above, the first authentication information may include a token and a certificate for signing an inquiry range and time information (e.g., timestamp), which is a range of personal information that may be provided to the information requesting device (e.g., the information requesting device 201 of FIG. 2A), and the processor 120 may obtain the first authentication information from the permission information received from the information requesting device.

The management server (e.g. the processor 120 of FIG. 1) according to various embodiments may obtain a second authentication information related to the information requesting device, in operation 520. The second authentication information may, as described above, include access information (e.g., login ID, password, etc.) used by the information requesting device to access a service account of the information providing device.

The management server (e.g. the processor 120 of FIG. 1) according to various embodiments may request authentication from the authentication server (e.g., the authentication server 207 of FIG. 2A), based on the first authentication information and the second authentication information, in operation 530. For example, the processor 120 may generate a transaction including the first authentication information and the second authentication information and transmit the transaction to the authentication server in order to request authentication. In addition before requesting authentication, the processor 120 may perform a predetermined authentication operation (e.g., password authentication, biometric information authentication, etc.) for authenticating the user of the information providing device.

The management server (e.g. the processor 120 of FIG. 1) according to various embodiments may receive a result for the authentication request, in operation 540. According to an embodiment, the processor 120 may determine whether the result notifying of authentication success is received from the authentication server.

The management server (e.g. the processor 120 of FIG. 1) according to various embodiments may obtain personal information corresponding to the request in response to receiving the result indicating authentication success, in operation 550. According to an embodiment, the processor 120 may perform an operation relating to at least one of the operations 430 and 440 of FIG. 4.

The management server (e.g. the processor 120 of FIG. 1) according to various embodiments may generate a notification indicating authentication failure in operation 560 in response to receiving the result notifying of the authentication failure. For example, the processor 120 may transmit a message indicating that the personal information cannot be provided due to the authentication failure to the information requesting device. As another example, the processor 120 may transmit a message indicating that an abnormal personal information request has occurred to the information providing device.

Figure 6:
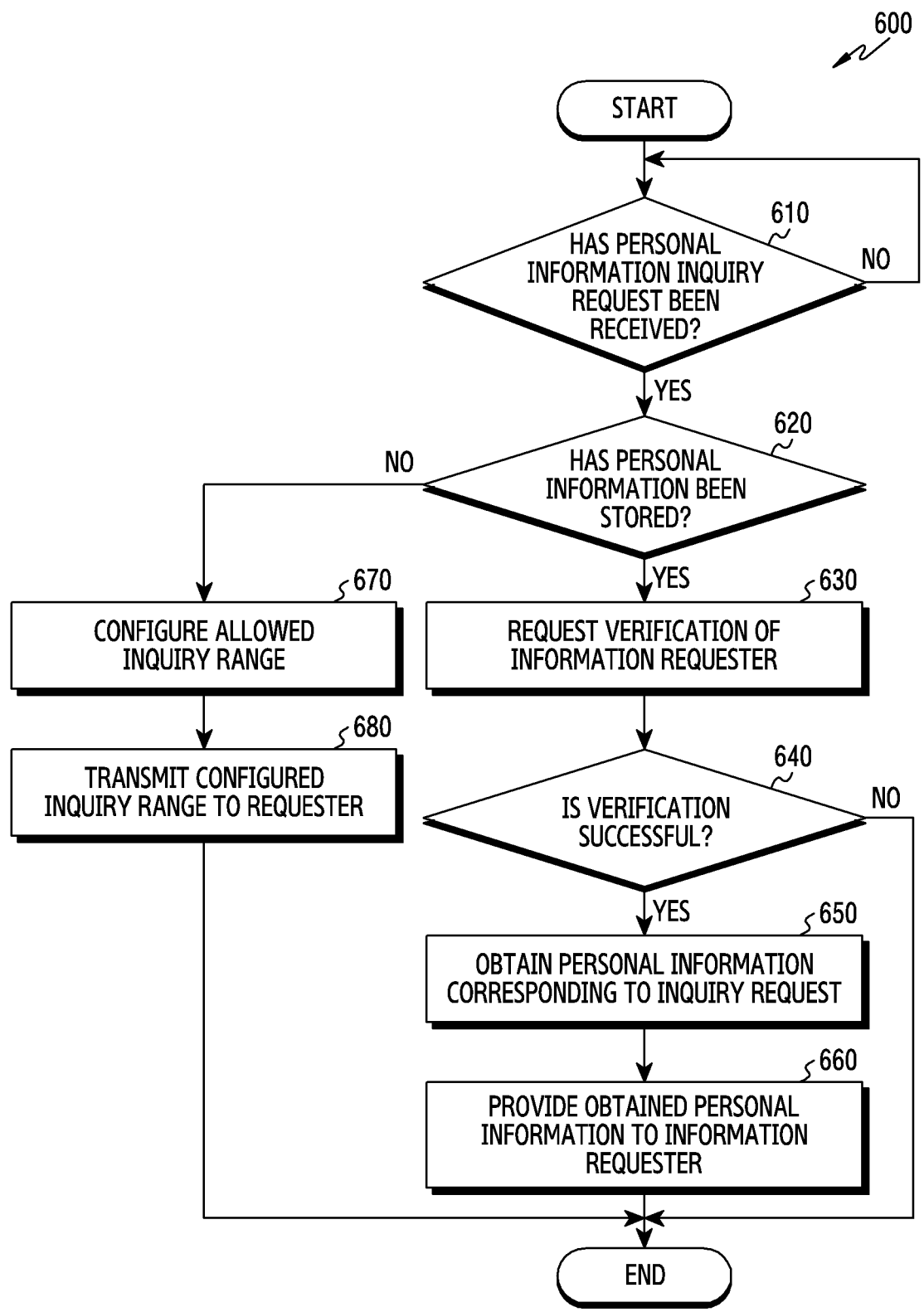
FIG. 6 is a flowchart illustrating an operation of processing a personal information request in an information providing device according to various embodiments of the disclosure.
Figure 7:
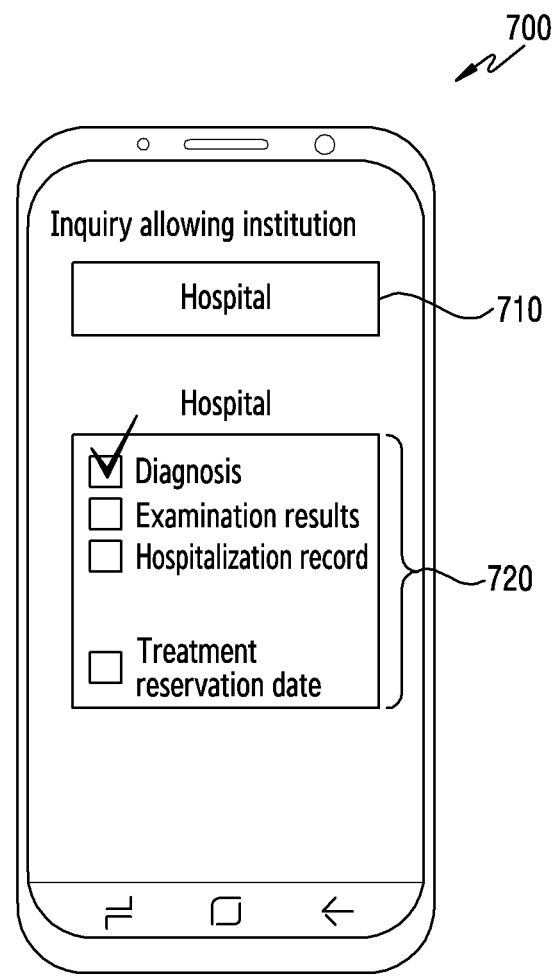
FIG. 7 is a view illustrating a situation in which a user interface configured to configure an inquiry range is output by an information providing device.

FIG. 6 is a flowchart 600 illustrating an operation of processing a personal information request in an information providing device according to various embodiments of the disclosure. FIG. 7 is a view 700 illustrating a situation in which a user interface configured to configure an inquiry range is output by an information providing device. Hereinafter, in the following embodiments, the operations may be sequentially performed, but are not necessarily performed sequentially. For example, the order of each operation may be changed and at least two operations may be performed in parallel. The information providing apparatus of FIG. 6 may be the information providing device 203 of FIGS. 2A to 2C.

Referring to FIG. 6, the information providing device (e.g., the processor 120 of FIG. 1) according to various embodiments may determine whether a personal information inquiry request is received from the information requesting device (e.g., the information requesting device 201 of FIG. 2A), in operation 610. For example, the personal information inquiry request may include an inquiry item designated by the information requesting device.

According to various embodiments, if the personal information inquiry request is not received, an information providing device (e.g., the processor 120 of FIG. 1) may perform an operation of identifying whether the personal information inquiry request is received.

According to various embodiments, if the personal information inquiry request is received, in operation 620, the information providing device (e.g., the processor 120 of FIG. 1) may determine whether personal information (e.g., personal information database of FIG. 2C) is stored and present for retrieval. For example, the personal information may include user information and derived information, as described above with reference to FIGS. 3A to 3B.

According to various embodiments, if the personal information is stored in the information providing device, the information providing device (e.g., the processor 120 of FIG. 1) may verify the validity of the personal information request and obtain personal information corresponding to the request to provide the same to the information requesting device. A detailed description thereof is as follows.

According to an embodiment, in operation 630, the information providing device (e.g., the processor 120 of FIG. 1) may request verification for the information requesting device. For example, as described above, the processor 120 may perform verification by transmitting information of the information requesting device to the authentication server. In operation 640, the processor 120 may receive a result of the verification request.

According to an embodiment of the disclosure, when receiving information indicating an authentication failure from the authentication server, the information providing device (e.g., the processor 120 of FIG. 1) may notify of the verification failure and stop sharing the personal information. For example, the processor 120 may display information indicating the verification failure through a display device (e.g., a display device 160 of FIG. 1).

According to an embodiment of the disclosure, when receiving information indicating authentication success from the authentication server, the information providing device (e.g., the processor 120 of FIG. 1) may receive personal information corresponding to a request of the information requesting device from a stored personal information database. In operation 660, the processor 120 may provide the obtained personal information to the information requesting device.

According to various embodiments of the disclosure, when the personal information is not stored in the information providing device, the information providing device (e.g., the processor 120 of FIG. 1) may process the personal information to be provided to the information requesting device through the management server (e.g., the management server 205 of FIG. 2A). A detailed description thereof is as follows.

According to an embodiment, in operation 670, the information providing device (e.g., the processor 120 of FIG. 1) may configure an inquiry range (e.g., a search range) indicating a range of personal information that is permitted for provision to the information requesting device. For example, as shown in FIG. 7, the processor 120 may output a user interface configured to designate an issuer 710 of personal information that permits inquiry, an item 720 that permits inquiry, and the like, and then, may configure the inquiry range, based on user input.

According to an embodiment, in operation 680, the information providing device (e.g., the processor 120 of FIG. 1) may provide the set inquiry range (e.g., search range) to the information requesting device. For example, the processor 120 may generate a token in which an inquiry range of personal information is signed and provide the token along with a certificate to the information requesting device. For example, the generated token may include a time information (e.g., a timestamp) that designates its (e.g., the information providing device 203) identifier and an inquiry range for allowing inquiry of personal information, as described above. In addition, the processor 120 may provide the token and certificate to the information request device 201 using wireless communication (e.g., mobile communication, Wi-Fi, Bluetooth, NFC, etc.), or may generate a code image (e.g., QR code, color code, etc.) including the token and certificate and provide the token and certificate to the information request device 201.

Figure 8:
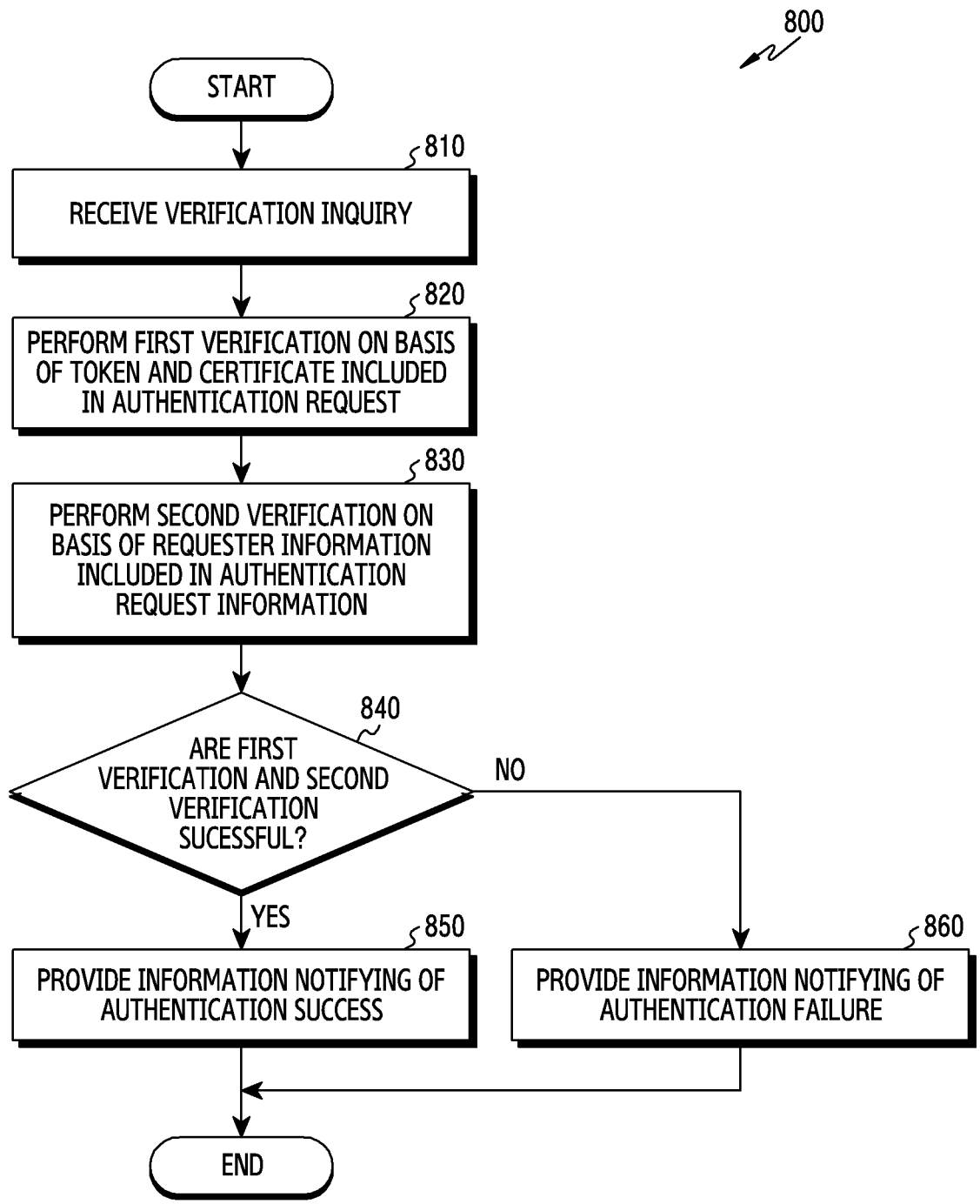
FIG. 8 is a flowchart illustrating an operation of validating a personal information request in an authentication server according to various embodiments of the disclosure.

FIG. 8 is a flowchart 800 illustrating an operation of validating a personal information request in an authentication server according to various embodiments of the disclosure. In the following embodiments, the operations may be performed sequentially, but are not necessarily performed sequentially. For example, the order of each operation may be changed and at least two operations may be performed in parallel. The authentication server of FIG. 8 may be the authentication server 207 of FIGS. 2A to 2C.

Referring to FIG. 8, in operation 810, the authentication server (e.g., the processor 120 of FIG. 1) according to various embodiments may receive a verification request. The verification request may be a validation request for the personal information request. According to an embodiment of the disclosure, the processor 120 may receive a verification request through an information providing device (e.g., the information providing device 203 of FIG. 2A) or a management server (e.g., the management server 205 of FIG. 2A).

In operation 820, the management server (e.g., the processor 120 of FIG. 1) may perform the first verification based on the token and the certificate included in the authentication request. The first verification may include validating the token and/or certificate generated by the information provision device. For example, the second verification may include a verification that determines the validity of the token, based on the token generation time. For example, if the time at which the token was generated is within a specified time (e.g., 10 minutes), the validity of the token may be recognized. In addition, if the time that the token is generated is not within the specified time, the validity of the token is not recognized, thereby preventing personal information from being queried for a predetermined time after the token is generated. According to an embodiment of the disclosure, the processor 120 may perform the first verification, based on at least a part of the public signature key for signature verification of the information providing device. For example, the public signature key may be included in a certificate included in the transaction generated by the information providing device 203, and the processor 120 may perform a first verification that verifies the received token using the public signature key. As another example, the processor 120 may additionally consider time information (e.g., timestamp) when performing the first verification. For example, the time information may be related to the verification request time (e.g., when the transaction was generated) and the like, and the processor 120 may determine that the certificate is valid when the verification request time is within a specified time (e.g., 10 minutes). However, this is merely an example, and embodiments of the disclosure are not limited thereto. For example, the processor 120 may perform the first verification using various techniques.

In operation 830, the management server (e.g., the processor 120 of FIG. 1) according to various embodiments may perform a second verification, based on information of the information requesting device included in the verification request. The second verification may include verifying the information requesting device requesting personal information. According to an embodiment, the processor 120 may perform the second verification by comparing the access information used by the information requesting device 201 to access the management server 205 with information related to the information requesting device stored in the personal information database (e.g., the personal information database 211 of FIG. 2A). However, this is merely an example, and embodiments of the disclosure are not limited thereto. For example, the processor 120 may perform the second verification using various techniques.

The management server (e.g., the processor 120 of FIG. 1) according to various embodiments may identify the result of the first verification and the second verification to determine whether they were successful, in operation 840.

According to various embodiments, when identifying that the first verification and the second verification are successful, the management server (e.g., the processor 120 of FIG. 1) may provide information indicating the verification success to the subject requesting verification in operation 850.

According to various embodiments, if at least one of the first verification and the second verification fails, the management server (e.g., the processor 120 of FIG. 1) may provide information indicating the verification failure to the subject requesting verification in operation 860.

Figure 9:
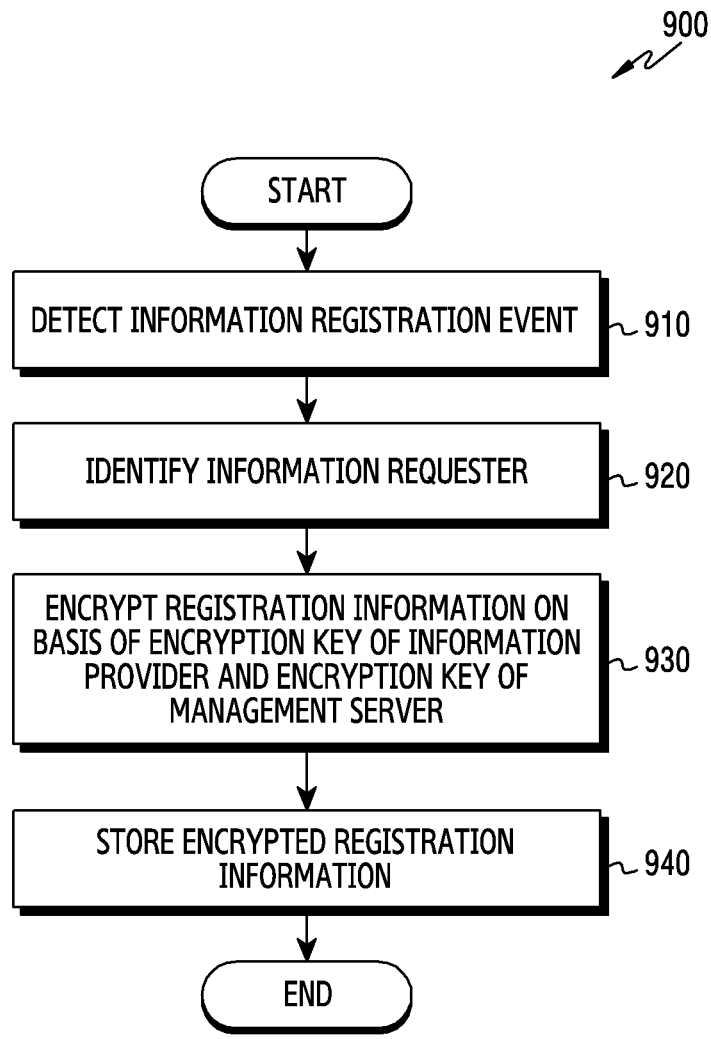
FIG. 9 is a flowchart illustrating an operation of registering personal information in a registration server according to various embodiments of the disclosure.

FIG. 9 is a flowchart 900 illustrating an operation of registering personal information in a registration server according to various embodiments of the disclosure. In the following embodiments, the operations may be performed sequentially, but are not necessarily performed sequentially. For example, the order of each operation may be changed and at least two operations may be performed in parallel. The registration server of FIG. 9 may be the registration server 209 of FIGS. 2A to 2C.

Referring to FIG. 9, in operation 910, the registration server (e.g., the processor 120 of FIG. 1) may receive an information registration request. According to an embodiment, the registration server may be connected to each node (e.g., the node 213 of FIG. 2A) that issues and manages personal information. In this case, the information registration request may include a situation in which personal information of the information providing device (e.g., the information providing device 203 of FIG. 2A) is issued or updated at each node. In another embodiment, the registration server may receive a request to change or add personal information from the information providing device (e.g., the information providing device 203 of FIG. 2A).

The registration server (e.g., the processor 120 of FIG. 1) according to various embodiments may identify an information providing device that is an owner of the information requested for registration, in operation 920.

The registration server (e.g., the processor 120 of FIG. 1) according to various embodiments may encrypt the registration information, based on at least a portion of the encryption key of the information providing device and the encryption key of the management server, in operation 930. For example, the encryption key used for encrypting the registration information may be a common encryption key shared between the management server (e.g., the management server 205 of FIG. 2A) and the information providing device. For example, the common cryptographic key may be generated via a Diffie-Hellman key agreement. Accordingly, the encrypted information may be decrypted by at least one of the encryption key of the information providing apparatus and the encryption key of the management server. However, this is merely an example, and various embodiments may be applied, and the embodiments of the disclosure are not limited thereto. For example, personal information can be encrypted by various kinds of encryption keys. In addition, the common encryption key may be a common encryption key that is shared between the other device (e.g., the registration server) and the information providing device instead of the management server.

In operation 940, the registration server (e.g., the processor 120 of FIG. 1) according to various embodiments may store the encrypted registration information. According to an embodiment, as described above, the registration server 209 may store the encrypted registration information in a personal information database corresponding to each node that issues and manages personal information. According to another embodiment, the registration server 209 may store the encrypted registration information in a personal information database accessible by different nodes.

According to various embodiments, an operation method of an electronic device (e.g., the management server 205 of FIG. 2A) may include detecting a personal information request event, identifying a validation result of the detected personal information request from at least one authentication server, when the validity of the personal information request is verified, obtaining the personal information, based on the inquiry range, and providing the obtained personal information to an information requesting device.

According to an embodiment, the detecting of the personal information request event may include receiving permission information generated by the information providing device from the information requesting device. For example, the permission information may include a token and a certificate in which at least one of an identifier of the information providing device that generated the permission information, an inquiry range of personal information, and time information specifying an inquiry range is signed with a signature key.

According to an embodiment, the validity verification result may include a first verification result for verifying the validity of the token and a second verification result for verifying the information request device that has transmitted the permission information, and the identifying of the validity verification result may include receiving the first verification result and the second verification result from the at least one authentication server.

According to an embodiment, the identifying of the validity verification result may include requesting the validity verification from the at least one authentication server and recording the validity verification request.

According to an embodiment, the obtaining of the personal information may include primarily classifying personal information associated with the information providing device from at least one piece of personal information stored in the registration server, based on the identifier of the information providing device included in the permission information, and secondarily classifying the primarily classified personal information, based on the inquiry range included in the permission information.

According to an embodiment, the providing of the obtained personal information to the information request device may include decrypting the obtained personal information, based on at least a portion of the encryption key of the information providing device and the encryption key of the electronic device.

Although various embodiments of the disclosure have been described above, modifications and changes may be made thereto without departing from the embodiments. Therefore, the disclosure should not be defined as being limited to the embodiments, but should be defined by the appended claims and equivalents thereof.

What is claimed is:

1. An electronic device, comprising:
a communication interface;
a memory; and
at least one processor operatively coupled to the communication interface and the memory, wherein the memory stores instructions executable by the processor to cause the electronic device to:
receive a personal information request from an information requesting device,
receive permission information generated by an information providing device, for allowing access to personal information from the information requesting device, wherein the permission information comprises a token and a certificate in which a search range of personal information and an identifier of the information providing device are signed with a signature key,
obtain access information used by the information requesting device from the information requesting device,
request a first validation of the personal information request from at least one authentication server based on the token and the certificate, and request a second validation of the information requesting device from at least one authentication server based on the access information,
in response to receiving a result indicating the first validation and the second validation are successful:
primarily classify personal information, as associated with the information providing device, based on at least one piece of personal information stored in a registration server, and the identifier of the information providing device; and
secondarily classify the primarily classified personal information, based on the search range;
decrypt the secondarily classified personal information, based on a first encryption key of the information providing device and a second encryption key of the electronic device, and
transmit the decrypted personal information to the information requesting device.

2. The electronic device of claim 1, wherein the instructions are further executable by the processor to cause the electronic device to:
request the permission information from the information providing device, and
wherein the permission information comprises the token and the certificate in which a time stamp associated with the search range is signed with the signature keys.

3. The electronic device of claim 2, wherein the received result comprises: a first validation result verifying the token and the certificate, and a second validation result verifying the information requesting device from which the permission information was requested, and
wherein the first validation result and the second validation result are received from the at least one authentication server.

4. The electronic device of claim 1, wherein the instructions are further executable by the processor to cause the electronic device to:
record the request for validation in the memory.

5. The electronic device of claim 1, wherein the at least one piece of personal information stored in the registration server is coupled in a blockchain.

6. An operation method of an electronic device, the method comprising:
receiving a personal information request from an information requesting device;
receiving permission information generated by an information providing device, for allowing access to personal information from the information requesting device, wherein the permission information comprises a token and a certificate in which a search range of personal information and an identifier of the information providing device are signed with a signature key;
obtaining access information used by the information requesting device from the information requesting device;
requesting a first validation of the personal information request from at least one authentication server based on the token and the certificate and requesting a second validation of the information requesting device from at least one authentication server; based on the access information;
in response to receiving a result indicating the first validation and the second validation are successful:
primarily classifying personal information, as associated with the information providing device, based on at least one piece of personal information stored in a registration server, and the identifier of the information providing device; and
secondarily classifying the primarily classified personal information, based on the search range;
decrypting the secondarily classified personal information, based on a first encryption key of the information providing device and a second encryption key of the electronic device; and
transmitting the decrypted retrieved personal information to the information requesting device.

7. The method of claim 6,
wherein the permission information includes the token and the certificate in which a time stamp associated with the search range is signed with the signature keys.

8. The method of claim 7, wherein the received result comprises: a first verification result verifying the token and the certificate, and a second validation result verifying the information requesting device from which the permission information was requested, and
wherein the first validation result and the second validation result are received from the at least one authentication server.

9. The method of claim 6, further comprising:
recording the request for validation in memory.

10. The method of claim 6, wherein the at least one piece of personal information stored in the registration server is coupled in a blockchain.

11. A personal information providing system, the system comprising:
an information requesting device configured to transmit a personal information request, the request associated with permission information generated by an information providing device;
an electronic device configured to receive a personal information request from an information requesting device, receive permission information generated by an information providing device, for allowing access to personal information from the information requesting device, obtain access information used by the information requesting device from the information requesting device, request a first validation of the personal information request from an authentication server based on a token and a certificate included in the permission information, and request a second validation of the information requesting device from the authentication server based on the access information, in response to receiving a result indicating the first validation and the second validation are successful: primarily classify personal information, as associated with the information providing device, based on at least one piece of personal information stored in a registration server, and an identifier of the information providing device; and secondarily classify the primarily classified personal information, based on an search range, decrypt the secondarily classified personal information, based on a first encryption key of the information providing device and a second encryption key of the electronic device, and transmit the decrypted personal information to the information requesting device,
wherein the permission information comprises the token and the certificate in which the search range of personal information and the identifier of the information providing device are signed with a signature key; and
the authentication server configured to perform a first validation verifying the validity of the token and the certificate, and the second validation verifying the information requesting device that transmitted the permission information, and transmit a validation result to the electronic device.

12. The system of claim 11,
wherein the registration server is configured to store at least one piece of personal information.

13. The system of claim 11, wherein the electronic device is configured to:
record the request for validation in a memory.

* * * * *